United States Patent
Jiang et al.

(10) Patent No.: US 9,113,328 B2
(45) Date of Patent: Aug. 18, 2015

(54) METHOD AND DEVICE FOR REQUESTING ALMOST BLANK SUBFRAMES IN HETEROGENEOUS NETWORKS

(75) Inventors: Qi Jiang, PuDong Jinqiao Shanghai (CN); Matthew Baker, Canterbury (GB); Teck Hu, Melbourne, FL (US); Gang Shen, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 108 days.

(21) Appl. No.: 13/883,336

(22) PCT Filed: Nov. 5, 2010

(86) PCT No.: PCT/CN2010/078459
§ 371 (c)(1),
(2), (4) Date: May 3, 2013

(87) PCT Pub. No.: WO2012/058820
PCT Pub. Date: May 10, 2012

(65) Prior Publication Data
US 2013/0329636 A1 Dec. 12, 2013

(51) Int. Cl.
*H04W 16/02* (2009.01)
*H04W 48/16* (2009.01)
(Continued)

(52) U.S. Cl.
CPC .............. *H04W 16/02* (2013.01); *H04W 48/16* (2013.01); *H04W 48/08* (2013.01); *H04W 72/00* (2013.01); *H04W 76/048* (2013.01); *H04W 88/08* (2013.01); *H04W 92/20* (2013.01)

(58) Field of Classification Search
None
See application file for complete search history.

(56) References Cited

U.S. PATENT DOCUMENTS

| 2010/0222062 | A1 | 9/2010 | Chou et al. | |
| 2011/0249642 | A1* | 10/2011 | Song et al. | 370/329 |
| 2012/0083280 | A1* | 4/2012 | Liu et al. | 455/446 |

FOREIGN PATENT DOCUMENTS

CN 101867936 A 10/2010
(Continued)

OTHER PUBLICATIONS

"Way Forward on time-domain extension of Rel 8/9 backhaul-based ICIC," TSG RAN WG1 Meeting #62bis, R1-105779, pp. 1-5, Xi'an, China, Oct. 11-15, 2010.
Alcatel Lucent Shanghai Bell, "Further Considerations of Time Domain Approach," 3GPP TSG RAN WG1 Meeting #62, R1-104416, 2 pages, Madrid, Spain, Aug. 23-27, 2010.
(Continued)

*Primary Examiner* — Ayaz Sheikh
*Assistant Examiner* — Tarell Hampton
(74) *Attorney, Agent, or Firm* — Fay Sharpe LLP

(57) ABSTRACT

One embodiment of the invention provides a mechanism to assist the eNodeB of the second cell, for example macrocell eNodeB or femtocell eNodeB to determine the configuration of ABSs. To be specific, the eNodeB of the first cell sends a request signaling to the eNodeB of the second cell to inform of the requirement for ABSs. The eNodeB of the second cell receives the request signaling from the eNodeB of the first cell, and then it determines the pattern of ABSs and sends the pattern of ABSs in the form of bitmap through a signaling to the eNodeB of the first cell. As the requirement for ABSs is determined by the eNodeB of the first cell on the basis of the number of the UEs and/or the traffic load of the UEs which are near the edge of coverage area of the picocell, it can help the eNodeB of the second cell to determine the configuration of ABSs, i.e. the pattern of ABSs, so that the efficient resource utilization is achieved.

11 Claims, 3 Drawing Sheets

(51) Int. Cl.
*H04W 48/18* (2009.01)
*H04W 76/04* (2009.01)
*H04W 88/08* (2009.01)
*H04W 72/00* (2009.01)
*H04W 48/08* (2009.01)
*H04W 92/20* (2009.01)

(56) References Cited

FOREIGN PATENT DOCUMENTS

| JP | 2010-246097 | 10/2010 |
| WO | WO 2010/006297 A2 | 1/2010 |
| WO | WO 2011/157236 A1 | 12/2011 |

OTHER PUBLICATIONS

LG Electronics, "Details of eICIC in Marco-Pico case," $3^{rd}$ Generation Partnership Project (3GPP), 3GPP TSG RAN WG1 Meeting #62bis, R1-105352, pp. 1-4, Xian, China, Oct. 11-15, 2010.

Alcatel Lucent et al., "Details of Time-domain Extension of rel-8/9 Backhaul-Based ICIC for Macro-Pico Case," $3^{rd}$ Generation Partnership Project (3GPP), 3GPP TSG RAN WG1 Meeting #62bis, R1-105214, 2 pages, Xi'an, P.R. China, Oct. 11-15, 2010.

International Search Report for PCT/CN2010/078459 dated Aug. 4, 2011.

Ericsson, "Details of almost blank subframes," 3GPP TSG RAN WG1, #62bis, R1-105335, pp. 1-6 Xi'an, China, Oct. 11-15, 2010.

* cited by examiner

METHOD AND DEVICE FOR REQUESTING ALMOST BLANK SUBFRAMES IN HETEROGENEOUS NETWORKS

TECHNICAL FIELDS

The invention relates to heterogeneous networks, particularly relates to eNodeBs in heterogeneous networks.

BACKGROUND OF THE INVENTION

Heterogeneous networks (HetNet) have been added to the scope of the LTE-A work item and now enhanced inter-cell interference coordination (eICIC) for co-channel HetNet deployment is one of the key technical points for Release 10.

Co-channel HetNets comprise macrocells and small cells operating on the same frequency channel. Such deployments present some specific interference scenarios for which new ICIC techniques are required.

In one scenario, the small cells are picocells, which are open to users of the macrocellular network. In order to ensure that such picocells carry a useful share of the total traffic load, user equipments (UEs) may be programmed to associate preferentially with the picocells rather than the macrocells, for example by biasing the SINR threshold at which they will select a picocell to associate with. Under such conditions, UEs near the edge of a picocell's coverage area will suffer strong interference from one or more macrocells. In order to alleviate such interference, some subframes may be configured as "blank" or "almost blank" in a macrocell. A blank subframe contains no transmission from the macrocell, while an "almost blank" subframe typically contains no data transmission and little or no control signaling transmission, but will contain reference signal transmissions in order to ensure backward compatibility with Release 8/9 UE which expects to find the reference signals for measurements but are unaware of the configuration of almost blank subframes. Almost blank subframes may also contain synchronization signals, broadcast control information and/or paging signals. For the simplicity, hereafter both blank and almost blank subframes are called as almost blank subframes (the term "ABSs" for short).

In order to make the use of ABSs effectively, signaling is needed to send the pattern of ABSs from the macrocell to the picocell across the corresponding backhaul interface, known in LTE as the "X2" interface. For LTE Release 10, it has been agreed that this signaling will take the form of a coordination bitmap to indicate the pattern of ABSs, for example with each bit corresponding to one subframe in a series of subframes, with the value of the bit indicating whether the subframe is an ABS or not. Please refer to R1-105779 "Way Forward on time-domain extension of Rel 8/9 backhaul-based ICIC" for details. Such signaling can help the picocell to schedule data transmissions in the picocell appropriately to avoid interference, for example by scheduling transmissions to UEs near the edge of the picocell during ABSs, and to signal to the UEs the subframes which should have low macrocellular interference and should therefore be used for RRM/RLM/CSI measurements.

The number of ABSs that need to be configured will depend on factors such as the traffic loading in the picocell. However, so far, no mechanism has been agreed to assist the macrocell to determine a useful number and pattern of ABSs to configure. In another similar scenario, the small cells are femtocells, which operate on a Closed Subscriber Group (CSG) basis, and are therefore typically not open to users of the macrocellular network. In this case, the femtocells can cause strong interference to the macrocell UEs when they come close to the femto eNodeBs. It may then be beneficial for the macrocells to request certain numbers of ABSs to be provided by the femtocells. In order to alleviate such interference, some subframes may be configured as ABSs.

Therefore, in this scenario, likewise, a mechanism is also required to assist the femtocell to determine a useful number and pattern of ABSs to configure.

SUMMARY OF THE INVENTION

To address above drawbacks, a mechanism to assist the macrocell in above first scenario or the femtocell in above second scenario to determine the configuration of almost blank subframes (ABSs),i.e. the pattern of almost blank subframes (pattern of ABSs) is provided according to one embodiment of the invention.

According to the first aspect of the invention, it is provided a method, in an eNodeB of a first cell in heterogeneous networks, of sending a request signaling to an eNodeB of a second cell, comprising: i. sending a request signaling to the eNodeB of the second cell, wherein the request signaling is used for informing the eNodeB of the second cell of a requirement for almost blank subframes.

According to the second aspect of the invention, it is provided a method, in an eNodeB of a second cell in heterogeneous networks, of determining a pattern of almost blank subframes, comprising: I. receiving a request signaling from an eNodeB of a first cell, wherein the request signaling comprises a requirement for almost blank subframes of the eNodeB of the first cell; II. determining the pattern of almost blank subframes; III. sending the pattern of almost blank subframes in the form of bitmap through a signaling to the eNodeB of the first cell, wherein the pattern of almost blank subframes is used for indicating the almost blank subframes in a series of subframes. According to the third aspect of the invention, it is provided an apparatus, in an eNodeB of a first cell in heterogeneous networks, for sending a request signaling to an eNodeB of a second cell, comprising: a first sending means, configured for sending a request signaling to the eNodeB of the second cell, wherein the request signaling is used for informing the eNodeB of the second cell of a requirement for almost blank subframes.

According to the fourth aspect of the invention, it is provided an apparatus, in an eNodeB of a second cell in heterogeneous networks, of determining a pattern of almost blank subframes, comprising: a second receiving means, configured for receiving a request signaling from an eNodeB of a first cell, wherein the request signaling comprises a requirement for almost blank subframes of the eNodeB of the first cell; a determining means, configured for determining the pattern of almost blank subframes; a second sending means, configured for sending the pattern of almost blank subframes in the form of bitmap through a signaling to the eNodeB of the first cell, wherein the pattern of almost blank subframes is used for indicating the almost blank subframes in a series of subframes.

In the invention, a request signaling is defined and sent from the eNodeB of the first cell, for example the picocell eNodeB to the eNodeB of the second cell, for example the macrocell eNodeB to inform of the requirement for ABSs, for example to recommend the macrocell eNodeB to increase/decrease the ratio of ABSs. As the requirement for ABSs in the request signaling is determined by the picocell eNode on the basis of the number of the UEs which are near the edge of coverage area of the picocell and/or the traffic load of the UEs which are near the edge of coverage area of the picocell, it can help the macrocell eNodeB to determine the configuration of ABSs, i.e. the pattern of ABSs, so that the efficient resource utilization is achieved.

BRIEF DESCRIPTION OF THE DRAWINGS

Other features, aspects and advantages of the present invention will become obvious by reading the following description of several non-limiting embodiments with the aid of appended drawings.

DETAILED DESCRIPTION OF THE EMBODIMENTS

To realize the technical solution of the invention, a new request signaling is defined as a new X2 signaling for interference coordination. The request signaling is sent by an eNodeB of a first cell to an eNodeB of a second cell, wherein the request signaling is used for informing the eNodeB of the second cell of the requirement for ABSs.

In one scenario, the first cell may be a picocell and the second cell may be a macrocell. In this scenario, UEs near the edge of coverage area of the picocell may suffer strong interference from the macrocell. To alleviate such interference, the request signaling is sent by the eNodeB of the picocell to the eNodeB of the macrocell to inform of the requirement for ABSs.

In another scenario, the first cell may be a macrocell and the second cell may be a femtocell. In this scenario, the femtocell may cause strong interference to the macrocell UEs when they come close to the femtocell eNodeBs. To alleviate such interference, the request signaling is sent by the eNodeB of the macrocell to the eNodeB of the femtocell to inform of the requirement for ABSs.

Hereafter, for illustrative purposes only, the technical solution of the invention will be described using a picocell as an illustrative example of the first cell and a macrocell as an illustrative example of the second cell. It shall be appreciated that a person of ordinary skill in the art can then fully appreciate the implementation of the technical solution in relation to a macrocell as the first cell and a femtocell as the second cell.

Figure 1:
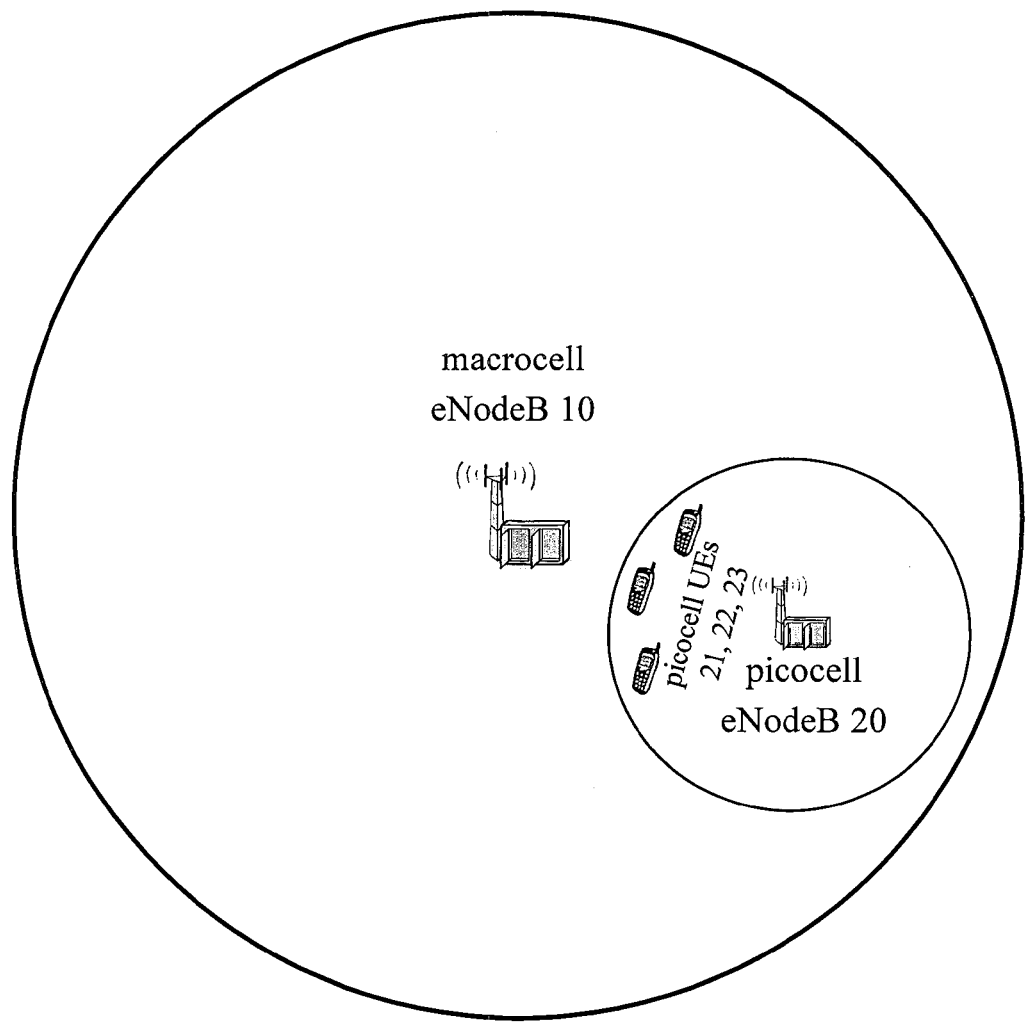
FIG. 1 illustrates a schematic view of a HetNet according to one embodiment of the invention.

FIG. 1 illustrates a schematic view of a HetNet according to one embodiment of the invention, wherein the HetNet comprises a macrocell eNodeB 10, a picocell eNodeB 20, and three picocell UEs 21, 22, 23 which are near the edge of coverage area of the picocell and suffered strong interference from the macrocell. For simplicity, macrocell UEs and other picocell UEs which are not near the edge of coverage area of the picocell are not shown in FIG. 1.

Figure 2:
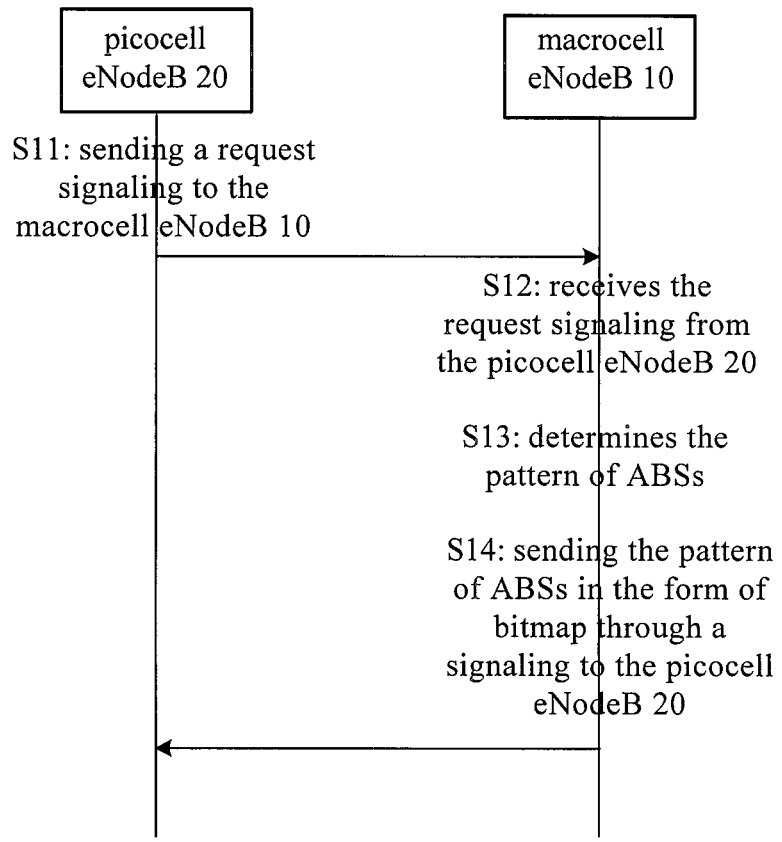
FIG. 2 illustrates a flowchart of a method of requesting ABSs according to one embodiment of the invention.

FIG. 2 illustrates a flowchart of a method of requesting ABSs according to one embodiment of the invention. Hereafter the method of requesting ABSs will be described by referring to FIG. 2 and in conjunction with FIG. 1.

Firstly, in step S11, the picocell eNodeB 20 sends a request signaling to the macrocell eNodeB 10 through X2 interface. The request signaling is used for informing the macrocell eNodeB 10 of the requirement for almost blank subframes (ABSs). Advantageously, the picocell eNodeB 20 determines the requirement for ABSs based on the number of the UEs which are near the edge of coverage area of the picocell and/or the traffic load of the UEs which are near the edge of coverage area of the picocell.

Then the picocell eNodeB 20 generates the request signaling based on the determined requirement for ABSs and sends the request signaling to the macrocell eNodeB 10.

Optionally, the requirement for ABSs included in the request signaling may be one of the followings:
  increasing the ratio of ABSs;
  decreasing the ratio of ABSs;
  keeping the ratio of ABSs unchanged;
  setting the ratio of ABSs to zero;
  restoring the ratio of ABSs to a previous level;
  requesting a specific ratio of ABSs;
  requesting a specific pattern of ABSs.

It is to be noted that the requirement for ABSs comprises but not limited to the above forms.

In addition, increasing the ratio of ABSs may comprise increasing the ratio of ABSs by 1 step or by 2 steps or by 3 steps, etc.

Likewise, decreasing the ratio of ABSs may comprise decreasing the ratio of ABSs by 1 step or by 2 steps or by 3 steps, etc. Advantageously, the type of contents in the request signaling is bit string. That is to say, the requirement for ABSs is in the form of bit string.

In an embodiment, the bit string may represent the increase/decrease of the ratio of ABSs. For example, it is assumed that the length of the bit string is two bits, as well as "00" may represent "increase the ratio of ABSs", "01" may represent "decrease the ratio of ABSs", "10" may represent "keep the ratio of ABSs unchanged" and "11" is reserved.

If the picocell eNodeB 20 would like to increase the ratio of ABSs, for example the picocell eNodeBs 20 found that the traffic load of the UEs which are near the edge of coverage area of the picocell increased, then the picocell eNodeB 20 puts two bits of "00" into the request signaling and sends the request signaling to the macrocell eNodeB 10 to recommend the macrocell eNodeB 10 to increase the ratio of ABSs, for example from 12.5%, i.e. one ABS out of eight subframes, to 25%, i.e. two ABSs out of eight subframes, or from 25% to 37.5%, i.e. three ABSs out of eight subframes.

If the picocell eNodeB 20 would like to decrease the ratio of ABSs, for example the picocell eNodeB 20 found that the traffic load of the UEs which are near the edge of coverage area of the picocell decreased, then the picocell eNodeB 20 puts two bits of "01" into the request signaling and sends the request signaling to the macrocell eNodeB 10 to recommend the macrocell eNodeB 10 to decrease the ratio of ABSs, for example from 50%, i.e. four ABSs out eight subframes, to 37.5%, or from 12.5% to 0%, i.e. no ABSs out of eight subframes. It is to be noted that in order to keep the 8 ms HARQ RTT timing for FDD, the 12.5% ratio of ABSs is a useful lowest ratio of ABSs.

If the picocell eNodeB 20 would like to keep the ratio of ABSs unchanged, then the picocell eNodeB puts two bits of "10" into the request signaling and sends the request signaling to the macrocell eNodeB 10 to recommend the macrocell eNodeB 10 to keep the ratio of ABSs unchanged.

It is to be noted that the item of "keep the ratio of ABSs unchanged" is not necessary since "keep the ratio of ABSs unchanged" can be understood from the absence of any request signaling at all.

In this embodiment, "11" is reserved, but those skilled in the art may appreciate that "11" may be used to represent, for example "setting the ratio of ABSs to zero", or "restoring the ratio of ABSs to a previous level", etc.

It shall be appreciated that the bit string of "00", "01", "10", "11" are not limited to above representations. In an example, "00" may represent "increase" the ratio of ABSs by 1 step", "01" may represent "decrease the ratio of ABSs by 1 step", "10" may represent "increase" the ratio of ABSs by 2 steps", "11" may represent "decrease the ratio of ABSs by 2 steps". If the picocell eNodeB 20 found that the traffic load of the UEs which are near the edge of coverage area of the picocell slightly increased, then the picocell eNodeB 20 puts two bits of "00" into the request signaling and sends the request signaling to the macrocell eNodeB 10 to recommend the macrocell eNodeB 10 to increase the ratio of ABSs by 1 step, for example from 12.5% to 25%. If the picocell eNodeB 20 found that the traffic load of the UEs which are near the edge of coverage area of the picocell dramatically increased, then the picocell eNodeB 20 puts two bits of "10" into the request signaling and sends the request signaling to the macrocell eNodeB 10 to recommend the macrocell eNodeB 10 to increase the ratio of ABSs by 2 steps, for example from 12.5% to 37.5%.

In another embodiment, the bit sting may directly represent the ratio of ABSs that the picocell eNodeB 20 requires. For example, it is assumed that the length of the bit string is three bits, as well as "000" may represent 0%, "001" may represent 12.5%, "010" may represent "25%", "011" may represent "37.5%", "100" may represent "50%", and "101-111" are reserved.

In a further embodiment, the bit string may directly represent the pattern of ABSs that the picocell eNodeB 20 expects to receive from the macrocell eNodeB 10. As the bitmap indicating the pattern of ABSs sent from the macrocell eNodeB 10 to picocell eNodeB 20 is preferable 40 bits, it is assumed that the length of the bit string is 40 bits, wherein "0" in the bit string may mean the normal subframe and "1" in the bit string may mean the almost blank subframe, or vice versa.

It is to be noted that the request signaling can be event triggering or periodically sent from the picocell eNodeB 20 to macrocell eNodeB 10.

After the picocell eNodeB 20 sends the request signaling to the macrocell eNodeB 10, then in step S12, the macrocell eNodeB 10 receives the request signaling from the picocell eNodeB 20.

After receiving the request signaling, then in step S13, the macrocell eNodeB 10 determines the pattern of ABSs.

To be specific, the macrocell eNodeB 10 may determine the pattern of ABSs based on the requirement for ABSs in the request signaling.

Hereafter, the step of "determining the pattern of ABSs based on the requirement for ABSs in the request signaling" will be described with reference to the above embodiment of "the bit string may represent the increase/decrease of the ratio of ABSs", wherein the length of the bit string is two bits, as well as "00" may represent "increase the ratio of ABSs", "01" may represent "decrease the ratio of ABSs", "10" may represent "keep the ratio of ABSs unchanged" and "11" is reserved.

First, the macrocell eNodeB 10 retrieves the requirement for ABSs in the request signaling, and then it determines the form of the requirement for ABSs.

If the requirement for ABSs is "00", then the macrocell eNodeB 10 increases the ratio of ABSs. It is to be noted that, if no bitmap indicating the pattern of ABSs is sent from the macrocell eNodeB 10 to the picocell eNodeB 20 previously, then the macrocell eNodeB 10 triggers the bitmap with minimum ratio of ABSs, for example 12.5%.

If the requirement for ABSs is "01", then the macrocell eNodeB 10 decreases the ratio of ABSs.

If the requirement for ABSs is "10", then the macrocell eNodeB 10 remains the current ratio of ABSs without change.

Certainly, the macrocell eNodeB 10 may disregard the requirement for ABSs in the request signaling, and determines the pattern of ABSs only based on the traffic load of the UEs which are served by the macrocell eNodeB 10. For example, if the traffic load of the UEs which are served by the macrocell eNodeB 10 is quite heavy, then the macrocell eNodeB 10 will disregard the requirement for ABSs and determines the pattern of ABSs only based on the traffic load of the UEs which are served by the macrocell eNodeB 10.

Preferably, the macrocell eNodeB 10 may determine the pattern of ABSs based on the requirement for ABSs in the request signaling and the traffic load of the UEs which are served by the macrocell eNodeB 10.

After determining the pattern of ABSs, then in step S14, the macrocell eNodeB 10 sends the pattern of ABSs in the form of bitmap through a signaling to the picocell eNodeB 20.

With the determined pattern of ABSs received from the macrocell eNodeB 10, the picocell eNodeB 20 may schedule data transmissions in the picocell appropriately to avoid interference, for example by scheduling transmissions to the UEs near the edge of coverage area of the picocell during almost blank subframes.

Optionally, after receiving the request signaling from the picocell eNodeB 20, the macrocell eNodeB 10 may send an acknowledge signaling to the picocell eNodeB 20 to inform of the receipt of the request signaling. It is to be noted that the feedback of the acknowledge signaling is not necessary.

Figure 3:
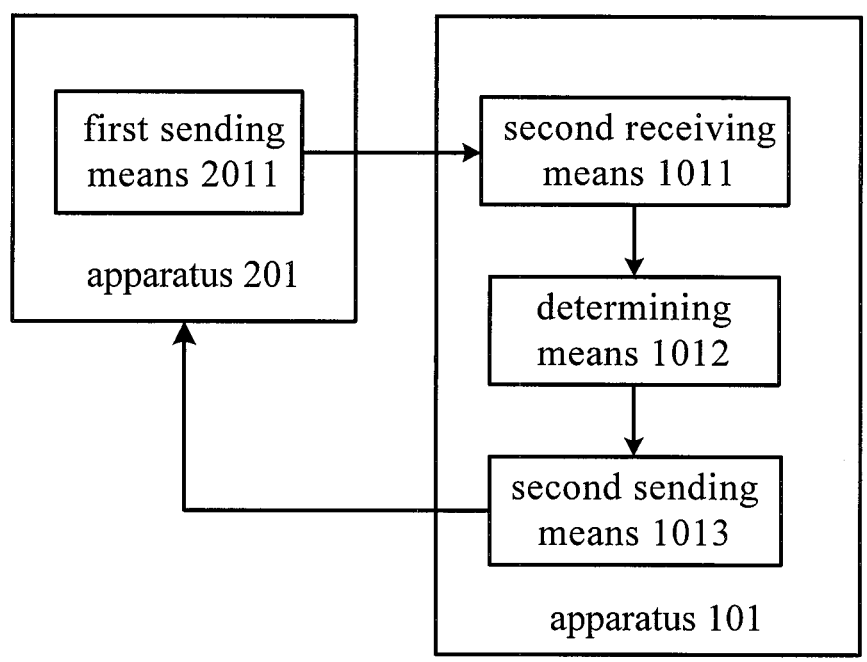
FIG. 3 illustrates a block diagram of an apparatus for requesting ABSs according to one embodiment of the invention.

FIG. 3 illustrates a block diagram of an apparatus for requesting ABSs according to one embodiment of the invention.

Firstly, the first sending means 2011 of the apparatus 201 in the picocell eNodeB 20 sends a request signaling to the macrocell eNodeB 10 through X2 interface. The request signaling is used for informing the macrocell eNodeB 10 of the requirement for almost blank subframes (ABSs).

Advantageously, the first sending means 2011 first determines the requirement for ABSs based on the number of the UEs which are near the edge of coverage area of the picocell and/or the traffic load of the UEs which are near the edge of coverage area of the picocell.

Then the first sending means 2011 generates the request signaling based on the determined requirement for ABSs and sends the request signaling to the macrocell eNodeB 10.

Optionally, the requirement for ABSs included in the request signaling may be one of the followings:
increasing the ratio of ABSs;
decreasing the ratio of ABSs;
keeping the ratio of ABSs unchanged;
setting the ratio of ABSs to zero;
restoring the ratio of ABSs to a previous level;
requesting a specific ratio of ABSs;
requesting a specific pattern of ABSs.

It is to be noted that the requirement for ABSs comprises but not limited to the above forms.

After the first sending means 2011 sends the request signaling to the macrocell eNodeB 10, then the second receiving means 1011 of the apparatus 101 in the macrocell eNodeB 10 receives the request signaling from the picocell eNodeB 20.

After receiving the request signaling, then the determining means 1012 of the apparatus 101 in the macrocell eNodeB 10 determines the pattern of ABSs.

To be specific, the determining means 1012 may determine the pattern of ABSs based on the requirement for ABSs in the request signaling.

Certainly, the determining means 1012 may disregard the requirement for ABSs in the request signaling, and determines the pattern of ABSs only based on the traffic load of the UEs which are served by the macrocell eNodeB 10.

Preferably, the determining means 1012 may determine the pattern of ABSs based on the requirement for ABSs in the request signaling and the traffic load of the UEs which are served by the macrocell eNodeB 10.

After the determining means 1012 determines the pattern of ABSs, the second sending means 1013 of the apparatus 101 in the macrocell eNodeB 10 sends the pattern of ABSs in the form of bitmap through a signaling to the picocell eNodeB 20.

With the determined pattern of ABSs received from the macrocell eNodeB 10, the picocell eNodeB 10 may schedule data transmissions in the picocell appropriately to avoid interference, for example by scheduling transmissions to the UEs near the edge of coverage area of the picocell during almost blank subframes.

Optionally, after the second receiving means 1011 receives the request signaling from the picocell eNodeB 20, then third sending means (not shown in FIG. 3) of the apparatus 101 in the macrocell eNodeB 10 may send an acknowledge signaling to the picocell eNodeB 20 to inform of the receipt of the request signaling. Then the first receiving means (not shown in FIG. 3) of apparatus 201 in the picocell eNodeB 20 receives the acknowledge signaling.

It is to be noted that the feedback of the acknowledge signaling is not necessary.

It should be noted that the above-mentioned embodiments illustrate rather than limit the invention and that those skilled in the art would be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the apparatus claims enumerating several units, several of these units can be embodied by one and the same item of hardware or software. The usage of the words first, second and third, et cetera, does not indicate any ordering. These words are to be interpreted as names.

What is claimed is:

1. A method, in an eNodeB of a first cell in heterogeneous networks, of sending a request signal to an eNodeB of a second cell, comprising:
    sending a request signal to the eNodeB of the second cell, wherein the request signal is used to inform the eNodeB of the second cell of a requirement for almost blank subframes, wherein the requirement for almost blank subframes is determined based on the number of user equipments which are near the edge of a coverage area of the first cell or a traffic load of the user equipments.

2. A method as claimed in claim 1, wherein the requirement for almost blank subframes comprises any one of the following:
    increasing the ratio of almost blank subframes;
    decreasing the ratio of almost blank subframes;
    keeping the ratio of almost blank subframes unchanged;
    setting the ratio of almost blank subframes to zero;
    restoring the ratio of almost blank subframes to a previous level;
    requesting a specific ratio of almost blank subframes;
    requesting a specific pattern of almost blank subframes.

3. A method as claimed in claim 1, further comprising:
    receiving an acknowledge signal from the eNodeB of the second cell, wherein the acknowledge signal is used to inform the eNodeB of the first cell of receipt of the request signal.

4. A method as claimed in claim 1, wherein the first cell and the second cell are configured as one of the following:
    the first cell being a picocell and the second cell being a macrocell;
    the first cell being a macrocell and the second cell being a femtocell.

5. A method, in an eNodeB of a second cell in heterogeneous networks, of determining a pattern of almost blank subframes, comprising:
    receiving a request signal from an eNodeB of a first cell, wherein the request signal comprises a requirement for almost blank subframes of the eNodeB of the first cell;
    determining the pattern of almost blank subframes based on the requirement for almost blank subframes in the request signal or a traffic load of user equipments which are served by the eNodeB of the second cell;
    sending the pattern of almost blank subframes in the form of a bitmap through a signal to the eNodeB of the first cell, wherein the pattern of almost blank subframes is used to indicate the almost blank subframes in a series of subframes.

6. A method as claimed in claim 5, further comprising:
    sending an acknowledge signal to the eNodeB of the first cell, wherein the acknowledge signal is used to inform the eNodeB of the first cell of receipt of the request signaling.

7. An apparatus, in an eNodeB of a first cell in heterogeneous networks, for sending a request signal to an eNodeB of a second cell, comprising:
    a first transmitter, configured to send a request signal to the eNodeB of the second cell, wherein the request signal is used to inform the eNodeB of the second cell of a requirement for almost blank subframes,
        wherein the first transmitter is further configured to determine the requirement for almost blank subframes based on the number of user equipments which are near the edge of a coverage area of the first cell or a traffic load of the user equipments.

8. An apparatus as claimed in claim 7, wherein the requirement for almost blank subframes comprises any one of the following:
    increasing the ratio of almost blank subframes;
    decreasing the ratio of almost blank subframes;
    keeping the ratio of almost blank subframes unchanged;
    setting the ratio of almost blank subframes to zero;
    restoring the ratio of almost blank subframes to a previous level;
    requesting a specific ratio of almost blank subframes;
    requesting a specific pattern of almost blank subframes.

9. An apparatus as claimed in claim 7, further comprising:
    a first receiver, configured to receive an acknowledge signal from the eNodeB of the second cell, wherein the acknowledge signal is used to inform the eNodeB of the first cell of receipt of the request signal.

10. An apparatus, in an eNodeB of a second cell in heterogeneous networks, of determining a pattern of almost blank subframes, comprising:
    a second receiver, configured to receive a request signal from an eNodeB of a first cell, wherein the request signal comprises a requirement for almost blank subframes of the eNodeB of the first cell;

a processor, configured to determine the pattern of almost blank subframes based on the requirement for almost blank subframes in the request signal or a traffic load of user equipments which are served by the eNodeB of the second cell;

a second transmitter, configured to send the pattern of almost blank subframes in the form of a bitmap through a signal to the eNodeB of the first cell, wherein the pattern of almost blank subframes is used to indicate the almost blank subframes in a series of subframes.

11. An apparatus as claimed in claim 10, further comprising:

a third transmitter, configured to send an acknowledge signal to the eNodeB of the first cell, wherein the acknowledge signal is used to indicate the eNodeB of the first cell of receipt of the request signal.

* * * * *